(12) United States Patent
Yoshikane

(10) Patent No.: US 11,046,470 B2
(45) Date of Patent: Jun. 29, 2021

(54) PACKAGING SYSTEM

(71) Applicant: TOYO JIDOKI CO., LTD., Tokyo (JP)

(72) Inventor: Tohru Yoshikane, Yamaguchi-ken (JP)

(73) Assignee: Toyo Jidoki Co., Ltd., Tokyo (JP)

( * ) Notice: Subject to any disclaimer, the term of this patent is extended or adjusted under 35 U.S.C. 154(b) by 165 days.

(21) Appl. No.: 16/521,047

(22) Filed: Jul. 24, 2019

(65) Prior Publication Data

US 2020/0031510 A1 Jan. 30, 2020

(30) Foreign Application Priority Data

Jul. 27, 2018 (JP) .............................. JP2018-141570

(51) Int. Cl.
*B65B 43/50* (2006.01)
*B65B 57/02* (2006.01)
*B65B 43/14* (2006.01)

(52) U.S. Cl.
CPC .............. *B65B 43/50* (2013.01); *B65B 43/14* (2013.01); *B65B 57/02* (2013.01)

(58) Field of Classification Search
CPC ......... B65B 43/12; B65B 43/14; B65B 43/16; B65B 43/18; B65B 43/465; B65B 57/04; B65B 43/50; B65B 43/60; B65B 57/02
USPC ........................................ 53/52, 64, 67, 253
See application file for complete search history.

(56) References Cited

U.S. PATENT DOCUMENTS 2,333,571 A 11/1943 Hohl et al.
2,991,605 A * 7/1961 Pollmann ................ B65B 19/24
53/253
4,648,234 A * 3/1987 Bellini .................. B65B 43/262
53/67
7,162,852 B2 * 1/2007 Eder ...................... B65B 43/465
53/253
2009/0233778 A1 * 9/2009 Tsutsui et al. ........ B65B 43/465
53/52
2010/0281822 A1 * 11/2010 Murray .................. B65B 39/02
53/64

(Continued)

FOREIGN PATENT DOCUMENTS

DE          542756 C   * 1/1932 ............. B65B 43/16
DE       3610945 C1   * 8/1987 ........... B65B 43/465

(Continued)

OTHER PUBLICATIONS

Extended European Search Report EP Application No. 19188225.7 dated Nov. 11, 2019.

*Primary Examiner* — Stephen F. Gerrity
(74) *Attorney, Agent, or Firm* — Pillsbury Winthrop Shaw Pittman, LLP

(57) ABSTRACT

A packaging system includes a packaging machine and a relay device. The relay device has a relay rotary table, a plurality of second holding portions, and an adjustment unit. The adjustment unit adjusts a relative angle between each of the second holding portions and the relay rotary table. The above relative angle is adjusted such that an angle of the second holding portion arranged on a supply station matches an angle of the first holding portion arranged on the supply station. Further, the above relative angle is adjusted such that an angle of the second holding portion arranged on a discharge station matches an angle of the first holding portion arranged on the discharge station.

18 Claims, 11 Drawing Sheets

(56) References Cited

U.S. PATENT DOCUMENTS

| | | | |
|---|---|---|---|
| 2014/0083061 A1* | 3/2014 | Ibaraki et al. | B65B 43/30 53/558 |
| 2017/0152067 A1* | 6/2017 | Nakamoto | B65B 43/14 |

FOREIGN PATENT DOCUMENTS

| | | | |
|---|---|---|---|
| GB | 772960 A | | 4/1957 |
| JP | 9-95318 A | | 4/1997 |
| JP | 2002355904 A | * | 12/2002 |
| JP | 2003146312 A | * | 5/2003 |
| JP | 3123709 U | | 7/2006 |
| JP | 2012-012041 A | | 1/2012 |
| JP | 2013-142003 A | | 7/2013 |
| JP | 2015-051782 A | | 3/2015 |
| WO | 2004/014729 A1 | | 2/2004 |
| WO | 2017/025465 A1 | | 2/2017 |
| WO | 2017/205164 A1 | | 11/2017 |

* cited by examiner

PACKAGING SYSTEM

CROSS-REFERENCE TO RELATED APPLICATIONS

This application is based upon and claims the benefit of priority from Japanese Patent Application No. 2018-141570, filed on Jul. 27, 2018; the entire contents of which are incorporated herein by reference.

TECHNICAL FIELD

The present invention relates to a packaging system in which a bag is supplied to a packaging machine via a relay device and the relay device receives the bag discharged from the packaging machine.

BACKGROUND ART

Packaging machines packaging contents in bags have been widely known (see Japanese patent application publication Nos. 2015-51782, 2012-12041, 2013-142003 and 9-95318, and Japanese Utility Model Registration No. 3123709). Bags are sequentially supplied to such a packaging machine, predetermined processing is performed in the packaging machine, and the processed bags are sequentially discharged from the packaging machine.

SUMMARY OF INVENTION

Technical Problem

When operating a packaging machine that consecutively processes multiple bags, it is necessary to use a device that consecutively supplies bags to the packaging machine and a device that appropriately transfers the bags consecutively discharged from the packaging machine to the subsequent stage.

In an apparatus disclosed in Japanese patent application No. 2015-51782, for example, a bag is supplied to a packaging machine via an empty bag supplying device, and the bag discharged from the packaging machine is placed on a product bag carry-out conveyor via a product bag unloading device to be sent to the subsequent stage. Further, Japanese patent application Nos. 2012-12041 and 2013-142003 disclose a product bag unloading devices configured to unload filled and sealed product bags fabricated by a packaging machine to the outside of the machine. Incidentally, although the supply of the bag with respect to the packaging machine is not particularly described in Japanese patent application No. 2012-12041, it is considered that the supply is performed via a device other than the product bag unloading device. Further, Japanese Utility Model Registration No. 3123709 discloses a device that supplies a packaging bag to a packaging machine. Although the discharge of the bag from the packaging machine is not particularly described in Japanese Utility Model Registration No. 3123709, it is considered that the discharge is performed via a device other than such a supplying device.

As described above, in conventional devices, a device configured to supply bags to the packaging machine (hereinafter also referred to as a "supplying device") and a device configured to receive the bag discharged from the packaging machine (hereinafter also referred to as a "receiving device") are separately provided. Therefore, it is necessary to secure a corresponding space to install these supplying device and receiving device. Further, it is necessary to provide drive sources respectively for the supplying device and the receiving device.

Meanwhile, if the supplying device and the receiving device can be realized using a single device, the space required for the installation can be reduced, and only the single drive source is required. However, in order to realize the supplying device and the receiving device using the single device (hereinafter also referred to as a "relay device"), it is necessary for this relay device to be capable of appropriately coping with both the supply and reception of bags.

For example, the relay device is required to appropriately receive and deliver bags at each of a position to receive a bag (hereinafter also referred to as an "unused bag") to be supplied to the packaging machine from an upstream device, a position to supply the unused bag to the packaging machine, a position to receive the bag (hereinafter also referred to as a "product bag") discharged from the packaging machine, and a position to deliver the product bag to a downstream device. These positions are separated from each other, and optimum angles of the bag to receive and deliver the bags are not necessarily the same among these positions. Therefore, the relay device is required to receive and deliver the bag at each angle optimized for each position.

Further, in the above-described devices disclosed in Japanese patent application publication Nos. 2015-51782, 2012-12041 and 2013-142003, and Japanese Utility Model Registration No. 3123709, a bag is received and delivered by reciprocating a bag holder such as a chuck that functions as a supplying device or a receiving device. In order to consecutively receive and deliver a plurality of bags in these devices, a bag holder having received a certain bag at a reception position is required to move to a delivery position and deliver the bag to the packaging machine at the delivery position, and then, the bag holder is required to return to the reception position and receive the next bag at the reception position. When the delivery of a bag is performed by the single bag holder in this manner, it is necessary to move the bag holder in two directions opposite to each other to reciprocate between the reception position and the delivery position. The time required for such reciprocating movement of the bag holder (in particular, the time for returning to the reception position from the delivery position) becomes a bottleneck, which hinders high-speed processing.

The present invention has been made in view of the above-described circumstances, and an object thereof is to provide a packaging system, capable of appropriately performing supply of a bag to a packaging machine and reception of the bag discharged from the packaging machine using the same device, and a technique related to the packaging system.

Solution to Problem

One aspect of the present invention is directed to a packaging system comprising: a packaging machine that has a plurality of first holding portions provided to be intermittently movable, and sequentially arranges each of the plurality of first holding portions at a plurality of stations including a supply station and a discharge station; and a relay device that supplies a bag to the first holding portion arranged at the supply station and receives a bag discharged from the first holding portion arranged at the discharge station, wherein the relay device includes: a relay rotary table which intermittently rotates about a relay rotation axis extending parallel to a height direction; a plurality of second holding portions which are attached to the relay rotary table and arranged at a pre-stage delivery station, the supply station, the discharge station, and a post-stage delivery station according to rotation of the relay rotary table; and an adjustment unit which adjusts a relative angle of each of the plurality of second holding portions with respect to the relay rotary table, wherein each of the plurality of second holding portions transfers a bag received at the pre-stage delivery station to the supply station and transfers a bag received at the discharge station to the post-stage delivery station, and wherein the adjustment unit adjusts the relative angle of the second holding portion arranged at the supply station so as to match an angle of the first holding portion arranged at the supply station, and adjusts the relative angle of the second holding portion arranged at the discharge station so as to match an angle of the first holding portion arranged at the discharge station.

The adjustment unit may include: a plurality of fixed shafts which are fixed to the relay rotary table and rotate about the relay rotation axis along with the relay rotary table; a plurality of swinging portions which are rotatably attached to the plurality of fixed shafts, respectively; a swing mechanism which swings each of the plurality of swinging portions depending on a position of the corresponding fixed shaft around the relay rotation axis; and a plurality of rotary shafts which are respectively connected to the plurality of swinging portions, respectively connected to the plurality of second holding portions, and provided to be rotatable about a holding rotation axis which is a central axis of each of the plurality of rotary shafts, the plurality of rotary shafts each rotating about the holding rotation axis by an angle corresponding to swinging of the corresponding swinging portion, and the relative angle of each of the plurality of second holding portions may be adjusted as each of the plurality of second holding portions rotates about the holding rotation axis along with the corresponding rotary shaft.

The swing mechanism may include: a plurality of guide shafts which are fixed to the plurality of swinging portions, respectively; and a guide plate which has a guide portion formed around the relay rotation axis, does not rotate about the relay rotation axis, and causes the plurality of guide shafts to be guided by the guide portion, the guide portion may guide the plurality of guide shafts in such a manner that a distance between the relay rotation axis and each of the plurality of guide shafts varies in a rotation direction about the relay rotation axis, and each of the plurality of swinging portions may swing about the corresponding fixed shaft depending on the distance of the corresponding guide shaft from the relay rotation axis.

The relay device may further include: an elevating mechanism which raises and lowers the plurality of second holding portions parallel to the height direction; a detection sensor which detects a position in the height direction of a bag held by the second holding portion arranged at the supply station or on an upstream side of the supply station; and a control unit which controls the elevating mechanism in accordance with a detection result of the detection sensor and adjusts a position of each of the plurality of second holding portions in the height direction.

The plurality of second holding portions may be arranged at a plurality of attachment positions which are angular positions different from each other in a rotational direction about the relay rotation axis.

At least some of the plurality of second holding portions may be simultaneously arranged at the pre-stage delivery station, the supply station, the discharge station, and the post-stage delivery station.

According to the present invention, the supply of the bag to the packaging machine and the reception of the bag discharged from the packaging machine can be appropriately performed using the same device.

DESCRIPTION OF EMBODIMENTS

Hereinafter, an embodiment of the present invention will be described with reference to the drawings.

Figure 1:
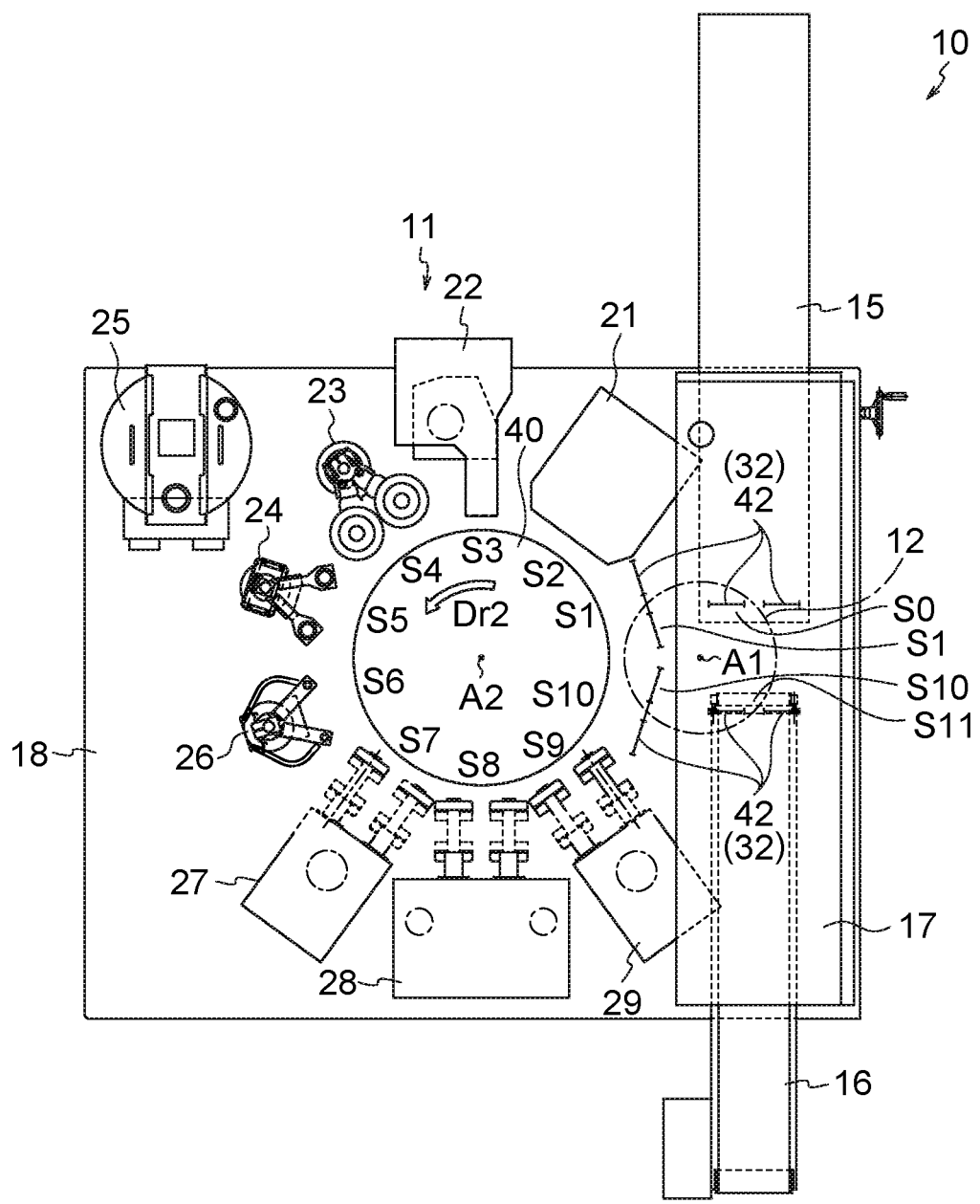
FIG. 1 is a plan view of a packaging system.
Figure 2:
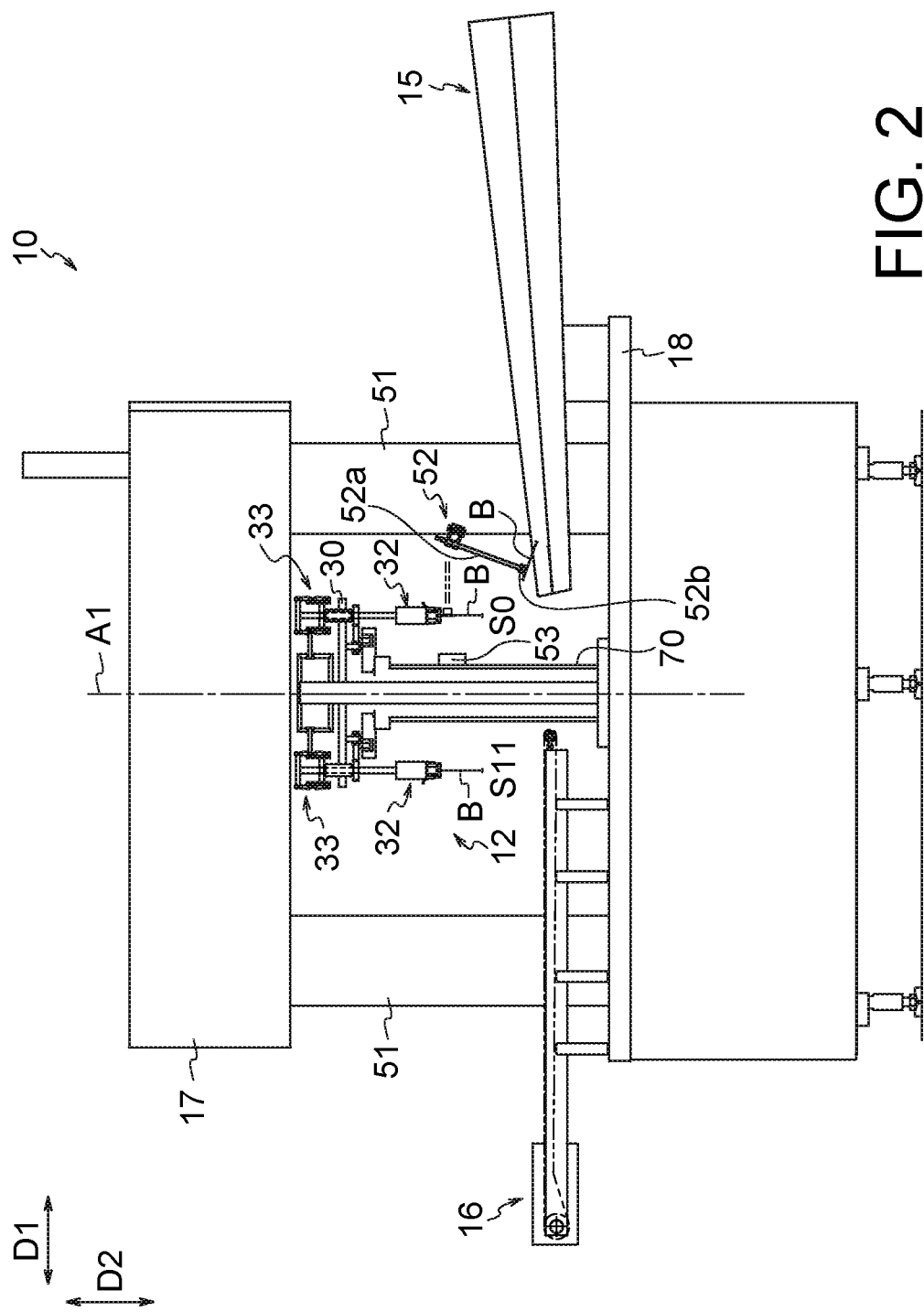
FIG. 2 is a side view of a relay device, a bag supply unit, a bag discharge unit, and a control panel illustrated in FIG. 1.
Figure 3:
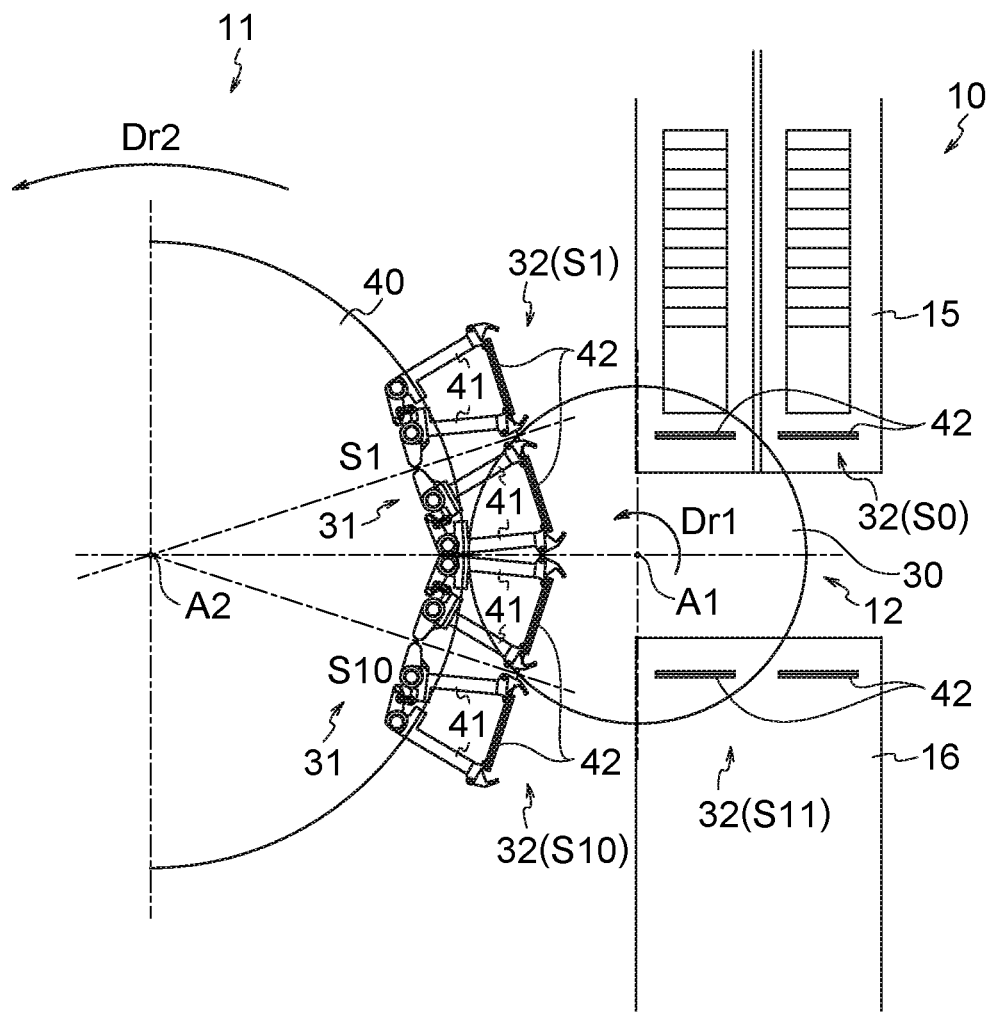
FIG. 3 is a plan view illustrating a schematic configuration of the relay device and the periphery thereof.

FIG. 1 is a plan view of a packaging system 10. FIG. 2 is a side view of a relay device 12, a bag supply unit 15, a bag discharge unit 16 and a control panel 17 illustrated in FIG. 1. FIG. 3 is a plan view illustrating a schematic configuration of the relay device 12 and the periphery thereof. FIGS. 1 to 3 do not illustrate some elements.

The packaging system 10 includes a packaging machine 11, the relay device 12, the bag supply unit 15, the bag discharge unit 16, and the control panel (control unit) 17 as illustrated in FIG. 1. The packaging machine 11, the relay device 12, the bag supply unit 15, the bag discharge unit 16, and the control panel 17 are supported by a mount 18. For example, the control panel 17 is fixed to the mount 18 via a support pillar 51, and is installed above each of the relay device 12, the bag supply unit 15, and the bag discharge unit 16 as illustrated in FIG. 2.

The illustrated packaging system 10 is a so-called double system, and each device of the packaging system 10 is configured to be capable of transporting and processing two bags B simultaneously.

[Packaging Machine]

As illustrated in FIG. 3, the packaging machine 11 has a disc-shaped packaging rotary table 40 and a plurality of first holding portions 31 attached to an outer circumferential portion of the packaging rotary table 40 at equal intervals. The packaging rotary table 40 is intermittently rotated in a packaging rotation direction Dr2 about its central axis (hereinafter also referred to as a "packaging rotation axis A2") extending parallel to a height direction D2. The plurality of first holding portions 31 attached to the packaging rotary table 40 move on a circular orbit about the packaging rotation axis A2 along with the intermittent axial rotation of the packaging rotary table 40. In this manner, the respective first holding portions 31 are provided so as to be intermittently movable, and sequentially stopped and arranged at a plurality of stations S1 to S10.

The number of the first holding portions 31 is the same as the number of the stations S1 to S10, and the illustrated packaging machine 11 includes the ten first holding portions 31. Since the illustrated packaging system 10 is the double system, each of the first holding portions 31 includes two gripper portions 41, and the twenty gripper portions 41 in total are attached to the packaging rotary table 40. Each of the gripper portions 41 is constituted by a pair of grippers, and both sides of each of the bags B are gripped by the pair of grippers.

The bag B is supplied to the first holding portion 31 arranged at the supply station S1, and the bag B is discharged from the first holding portion 31 arranged at the discharge station S10. Arbitrary processing is performed at stations S2 to S9 provided between the supply station S1 and the discharge station S10. As an example, the plurality of stations S1 to S10 included in the packaging machine 11 illustrated in FIG. 1 include the supply station S1, a printing station S2, an opening station S3, a solid-filling station S4, a liquid-filling station S5, a cleaning station S6, a first sealing station S7, and a second sealing station S8, a cooling station S9, and the discharge station S10.

The bag B having been delivered to the first holding portion 31 at the supply station S1 is transferred to the printing station S2 together with the first holding portion 31, and is subjected to printing by a printing device 21 at the printing station S2. Information to be printed on the bag B by the printing is not limited, and for example, information such as a manufacturing date, an expiration date and/or a manufacturing factory is printed on the bag B. At the opening station S3, an opening of the bag B is opened by an opening device 22. At the solid-filling station S4, solids are introduced inside the bag B through an opened opening by a solid-filling device 23 provided with a hopper or the like. At the liquid-filling station S5, a liquid stored in a liquid storage unit 25 is introduced into the bag B by a liquid-filling device 24.

At the cleaning station S6, a cleaning device 26 removes contents and the like attached to a planned sealing point of the bag B (for example, the opening and the vicinity thereof). As an example, the cleaning device 26 includes an air nozzle, and can remove filling materials adhering to the planned sealing point by blowing air ejected from the air nozzle onto the planned sealing point of the bag B. At the first sealing station S7 and the second sealing station S8, sealing is performed by sandwiching the planned sealing point of the bag B with heat plates of a first sealing device 27 and a second sealing device 28. At the cooling station S9, cooling is performed by sandwiching a sealed point of the bag B with cooling plates of a cooling device 29.

[Relay Device]

The relay device 12 supplies the bag B to the first holding portion 31 arranged at the supply station S1, and receives the bag B discharged from the first holding portion 31 arranged at the discharge station S10. Specifically, the relay device 12 transports the bag B received from the bag supply unit 15 (for example, a conveyor magazine) at a pre-stage delivery station S0 to the supply station S1, and delivers the bag B to the gripper portion 41 at the supply station S1. In addition, the relay device 12 transports the bag B received from the gripper portion 41 to the post-stage delivery station S11 at the discharge station S10, and delivers the bag B to the bag discharge unit 16 (for example, a belt conveyor) at the post-stage delivery station S11.

As illustrated in FIG. 2, the relay device 12 of the present embodiment includes a relay rotary table 30, a plurality of second holding portions 32, and a plurality of adjustment units 33. The relay rotary table 30 has a disk shape, and intermittently rotates in a relay rotation direction Dr1 (see FIG. 3) about its central axis (hereinafter also referred to as a "relay rotation axis A1") extending parallel to the height direction D2.

The plurality of second holding portions 32 are attached to the relay rotary table 30 at equal angular intervals in the relay rotation direction Dr1, and are intermittently arranged at the pre-stage delivery station S0, the supply station S1, the discharge station S10, and the post-stage delivery station S11 along with the rotation of the relay rotary table 30. The illustrated pre-stage delivery station S0, supply station S1, discharge station S10, and post-stage delivery station S11 are shifted by 90 degrees. As the relay rotary table 30 is rotated by 90 degrees in the relay rotation direction Dr1 in a state where the second holding portion 32 is arranged at the pre-stage delivery station S0, the second holding portion 32 is arranged at the supply station S1. Further, as the relay rotary table 30 is rotated by 90 degrees in the relay rotation direction Dr1 in a state where the second holding portion 32 is arranged at the supply station S1, the second holding portion 32 is arranged at the discharge station S10. Further, as the relay rotary table 30 is rotated by 90 degrees in the relay rotation direction Dr1 in a state where the second holding portion 32 is arranged at the discharge station S10, the second holding portion 32 is arranged at the post-stage delivery station S11. Further, as the relay rotary table 30 is rotated by 90 degrees in the relay rotation direction Dr1 in a state where the second holding portion 32 is arranged at the post-stage delivery station S11, the second holding portion 32 is arranged at the pre-stage delivery station S0.

As described above, the plurality of second holding portions 32 attached to the relay rotary table 30 are arranged at a plurality of attachment positions which are angular positions different from each other in the relay rotation direction Dr1 about the relay rotation axis A1. The plurality of attachment positions are provided at equal angular intervals in the relay rotation direction Dr1, and are shifted by 90 degrees in the present embodiment. The number of attachment positions of the second holding portions 32 is preferably a multiple of two, and preferably a multiple of four.

When the number of attachment positions of the second holding portions 32 is a multiple of two, for example, it is possible to simultaneously arrange the second holding portions 32 at the pre-stage delivery station S0 and the discharge station S10, and further, it is possible to simultaneously arrange the second holding portions 32 at the supply station S1 and the post-stage delivery station S11. Further, when the number of attachment positions of the second holding portions 32 is a multiple of four, it is possible to simultaneously arrange the second holding portions 32 at the pre-stage delivery station S0, the supply station S1, the discharge station S10, and the post-stage delivery station S11. In the illustrated relay device 12, the number of attachment positions is "4".

As described above, each of the second holding portions 32 transfers the bag B received at the pre-stage delivery station S0 to the supply station S1, and transfers the bag B received at the discharge station S10 to the post-stage delivery station S11. Then, at least some of the plurality of second holding portions 32 attached to the relay rotary table 30 are simultaneously arranged at the pre-stage delivery station S0, the supply station S1, the discharge station S10, and the post-stage delivery station S11. In the illustrated relay device 12, all the second holding portions 32 (that is, the four second holding portions 32) are simultaneously arranged at all of the pre-stage delivery station S0, the supply station S1, the discharge station S10, and the post-stage delivery station S11, and can simultaneously deliver the bag B at each station.

Since the packaging system 10 of the present embodiment is the double system, each of the second holding portions 32 includes two chuck portions 42 as illustrated in FIG. 3. Each of the chuck portions 42 has an air chuck structure capable of holding an upper end of the bag B, and is open and closed in accordance with a supply amount and a supply pressure of air controlled by the control panel 17. Each of the chuck portions 42 holds a region above a region of the bag B gripped by the gripper portion 41. Therefore, the gripper portion 41 and the chuck portion 42 do not interfere with each other at the supply station S1, and the bag B is gripped by the gripper portion 41 in the state of being held by the chuck portion 42 and is released from the chuck portion 42 in the state of being gripped by the gripper portion 41. Further, the gripper portion 41 and the chuck portion 42 do not interfere with each other even at the discharge station S10, and the bag B is held by the chuck portion 42 in the state of being held by the gripper portion 41 and is released from the gripper portion 41 in the state of being held by the chuck portion 42.

As illustrated in FIG. 2, the pre-stage delivery station S0 is provided with an unloading device 52 pivotally attached to the support pillar 51. The illustrated unloading device 52 includes an arm 52a having one end rotatably attached to the support pillar 51, and a suction plate 52b attached to the other end of the arm 52a. Under the control of the control panel 17, the arm 52a is pivoted about the attachment position with respect to the support pillar 51, and the bag B is sucked and held by the suction plate 52b and is released. The bag B, which has been transported to the pre-stage delivery station S0 in a recumbent posture by the bag supply unit 15, is delivered in a standing posture to the second holding portion 32 arranged at the pre-stage delivery station S0 via the unloading device 52 driven under the control of the control panel 17.

Incidentally, the relay device 12 may have a detection sensor 53 which directly or indirectly detects a position with respect to the height direction D2 of the bag B held by the second holding portion 32 arranged at the supply station S1 or on the upstream side of the supply station S1. The relay device 12 illustrated in FIG. 2 is provided with the detection sensor 53 that acquires a position in the height direction D2 of the bag B delivered to the second holding portion 32, arranged at the pre-stage delivery station S0, and indirectly detects a position in the height direction of the second holding portion 32 arranged at the supply station S1. The detection sensor 53 can be configured using any device capable of detecting the position in the height direction D2 of the bag B, and is typically configured using an imaging device (camera) or an optical sensor. Although the illustrated detection sensor 53 is attached to a cam fixing stand 70, an installation mode of the detection sensor 53 is not limited, and the detection sensor 53 can be installed in any mode that can detect the position in the height direction D2 of the bag B. A detection result of the detection sensor 53 is sent to the control panel 17.

The adjustment unit 33 adjusts a relative angle of each of the second holding portions 32 with respect to the relay rotary table 30. Specifically, the relative angle of each of the second holding portions 32 with respect to the relay rotary table 30 is adjusted by the adjustment unit 33 such that the position and the angle of the second holding portion 32 arranged at the supply station S1 match the position and the angle of the first holding portion 31 arranged at the supply station S1. Specifically, the relative angle of each of the second holding portions 32 with respect to the relay rotary table 30 is adjusted by the adjustment unit 33 such that the position and the angle of the second holding portion 32 arranged at the discharge station S10 match the position and the angle of the first holding portion 31 arranged at the discharge station S10. Similarly, the relative angle of each of the second holding portions 32 with respect to the relay rotary table 30 is adjusted by the adjustment unit 33 such that the position and angle of the second holding portion 32 arranged at the pre-stage delivery station S0 match the position and angle of the bag supply unit 15 and the unloading device 52 (see FIG. 2) and the position and the angle of the second holding portion 32 arranged at the post-stage delivery station S11 match the position and the angle of the bag discharge unit 16. Incidentally, the relative angle of each of the second holding portions 32 with respect to the relay rotary table 30 will be described later (see FIGS. 7 to 9).

The adjustment unit 33 can be configured using an arbitrary device capable of adjusting the relative angle between each of the second holding portions 32 and the relay rotary table 30. As an example, the illustrated adjustment unit 33 using a cam mechanism will be described hereinafter.

Figure 4:
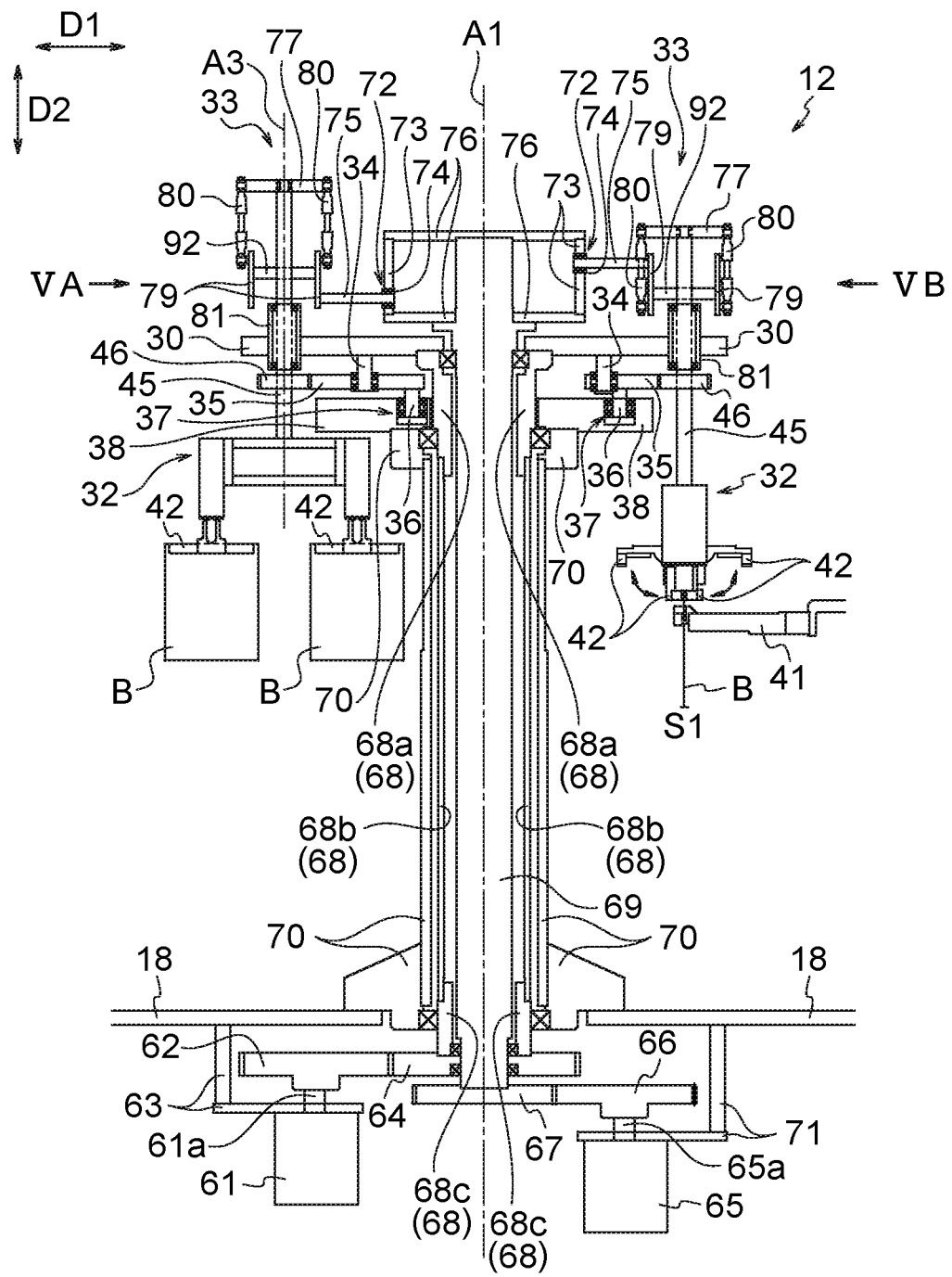
FIG. 4 is a side view illustrating a configuration example of the relay device.
Figure 5A:
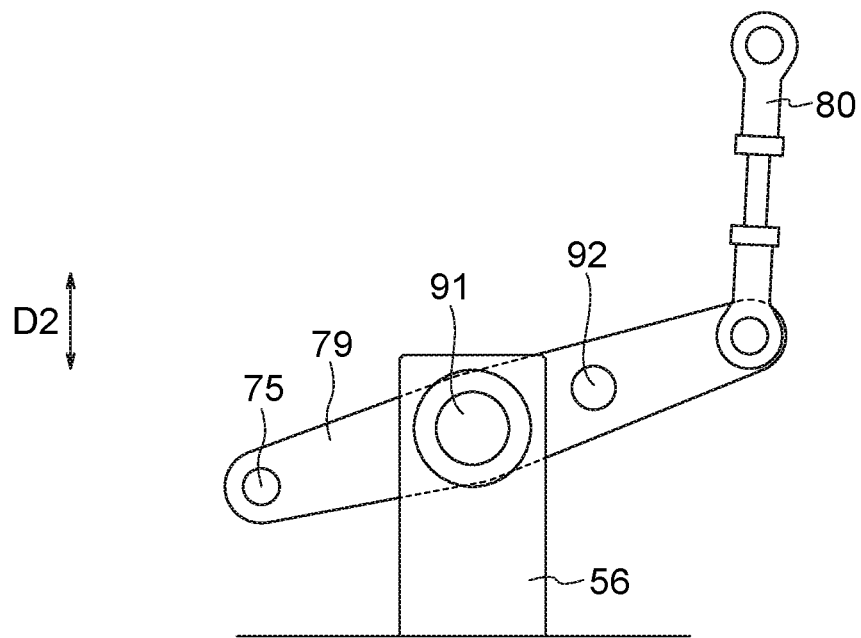
FIG. 5A is a view illustrating a state of an adjustment unit (in particular, a lever arranged in the inner side) indicated by an arrow VA of FIG. 4.
Figure 5B:
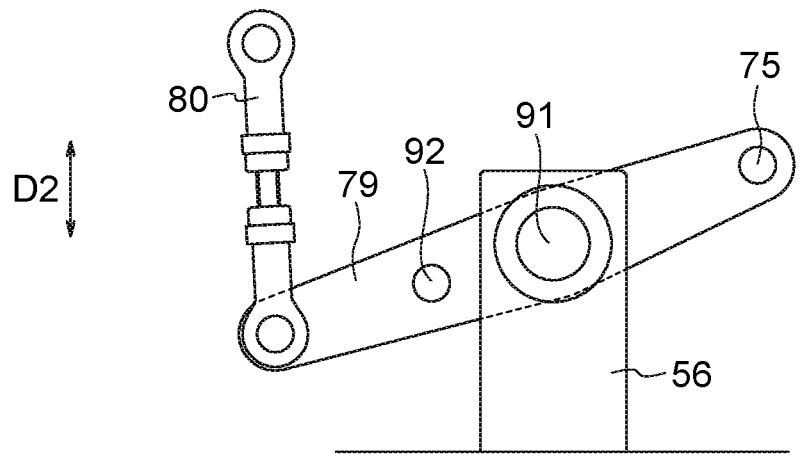
FIG. 5B is a view illustrating a state of the adjustment unit (in particular, the lever arranged on the inner side) indicated by an arrow VB of FIG. 4.
Figure 6:
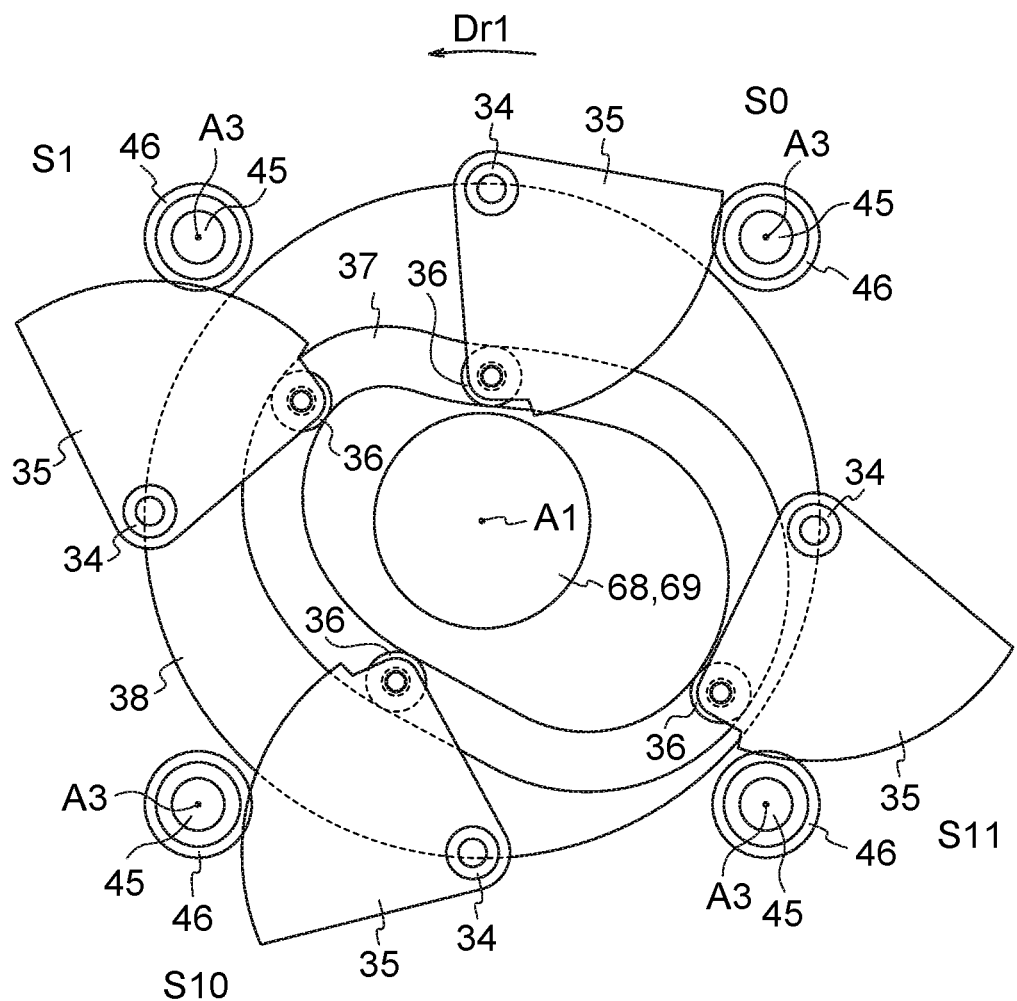
FIG. 6 is a plan view illustrating a configuration of a part of the adjustment unit illustrated in FIG. 4.

FIG. 4 is a side view illustrating a configuration example of the relay device 12. FIG. 5A is a view illustrating the state of the adjustment unit 33 (in particular, a lever 79 arranged on the inner side) indicated by an arrow VA of FIG. 4. FIG. 5B is a view illustrating the state of the adjustment unit 33 (in particular, the lever 79 arranged on the inner side) indicated by an arrow VB in FIG. 4. FIG. 6 is a plan view illustrating a configuration of a part of the adjustment unit 33 illustrated in FIG. 4. FIGS. 4 to 6 do not illustrate some elements. For example, only two sets of the adjustment units 33 are illustrated in FIG. 4, but the relay device 12 actually has the adjustment units 33 as many as the second holding portions 32 (for example, four sets of the adjustment units 33). Further, FIG. 4 does not illustrate a lever holding portion 56 and a lever shaft 91 (see FIGS. 5A and 5B). Further, FIGS. 5A and 5B do not illustrate the lever 79 arranged on the outer side among the two levers 79 which form a pair.

The illustrated adjustment unit 33 rotates the second holding portions 32 about central axes (hereinafter also referred to as "holding rotation axis A3") of rotary shafts 45 extending parallel to the height direction D2 via the rotary shafts 45. As a result, the adjustment unit adjusts the relative angle between each of the second holding portions 32 and the relay rotary table 30.

Further, the adjustment unit 33 includes a plurality of fixed shafts 34 fixed to the relay rotary table 30; a plurality of swinging portions 35 rotatably attached to the plurality of fixed shafts 34, respectively; a plurality of guide shafts 36 fixed to the plurality of swinging portions 35, respectively; and a guide plate 38 which does not rotate about the relay rotation axis A1 in addition to the plurality of rotary shafts 45 (that is, the four rotary shafts 45) described above. Further, in the relay device 12 illustrated in FIG. 4, a first motor 61 is fixed to the mount 18 via a first motor support portion 63, and a second motor 65 is fixed to the mount 18 via a second motor support portion 71.

A first gear 62 is fixed to a rotation output shaft 61a of the first motor 61, and the first gear 62 is engaged with a second gear 64 via a gear. A first rotary shaft 68 (that is, a first rotary cylinder 68a, a second rotary cylinder 68b, and a third rotary cylinder 68c fixed to each other) is fixed to the second gear 64, and the first rotary shaft 68 extends in the height direction D2 so as to surround a second rotary shaft 69. The relay rotary table 30 is fixed to the first rotary shaft 68 (in particular, the first rotary cylinder 68a), and the relay rotary table 30 rotates about the relay rotation axis A1 together with the first rotary shaft 68.

A third gear 66 is attached to a rotation output shaft 65a, of the second motor 65, and the third gear 66 is engaged with a fourth gear 67 via a gear. One end (lower end) of the second rotary shaft 69 is fixed to the fourth gear 67, and the second rotary shaft 69 rotates about the relay rotation axis A1 together with the fourth gear 67.

A cam fixing stand 70 is further fixed to the mount 18. The second rotary cylinder 68b extends in the height direction D2 on the inner side of the cam fixing stand 70, the first rotary cylinder 68a protrudes upward from the cam fixing stand 70, and the third rotary cylinder 68c protrudes downward from the cam fixing stand 70. Further, the cam fixing stand 70 rotatably holds the third rotary cylinder 68c. The second rotary shaft 69 extends in the height direction D2 on the inner side of the first rotary shaft 68 and is rotatably held by each of the second gear 64, the third rotary cylinder 68c, and the first rotary cylinder 68a.

Two disc-shaped second cam holding portions 76, arranged to be spaced apart in the height direction D2, are fixed to the other end (upper end) of the second rotary shaft 69, and each of the second cam holding portions 76 extends in a horizontal direction D1. Cylindrical second cams 73 extending in the height direction D2 are fixed to ends of the respective second cam holding portions 76. Endless cam grooves 72 extending in the relay rotation direction Dr1 are formed in the second cams 73, respectively. The cam grooves 72 are provided equidistantly from the relay rotation axis A1 so as to surround the second rotary shaft 69, but positions thereof in the height direction D2 vary in the relay rotation direction Dr1.

In the cam groove 72, a second cam roller 74 provided at one end of a support shaft 75 is arranged to be slidable and axially rotatable in the relay rotation direction Dr1. The lever 79 (in particular, the lever 79 arranged on the inner side between the two levers 79 forming the pair) is fixed at the other end of the support shaft 75, and this lever 79 is provided so as to be rotatable about the central axis of the support shaft 75 together with the support shaft 75.

In the present embodiment, the two levers 79 forming the pair are supported by the lever holding portions 56, respectively, via the lever shaft 91, and each of the levers 79 is rotatably attached to the lever shaft 91 and swings about the lever shaft 91. The lever holding portion 56 is fixed to the relay rotary table 30. In the illustrated example, the two levers 79, which form the pair and correspond to each other, have mutually different shapes. Although the support shaft 75 is directly connected to one of the two corresponding levers 79 (in the illustrated example, the lever 79 on the inner side (that is, on the relay rotation axis A1 side)), but is not directly connected to the other (in the illustrated example, the lever 79 on the outer side).

The two mutually corresponding levers 79 are connected to each other by a lever support member 92 and exhibit the same behavior. The inner lever 79 between the two mutually corresponding levers 79 receives a force directly from the support shaft 75 to swing in response to an elevating operation of the support shaft 75. In addition, the outer lever 79 between the two mutually corresponding levers 79 receives a force from the support shaft 75 via the one lever 79 and the lever support member 92 to swing in the same manner as the one lever 79.

Incidentally, the two mutually corresponding levers 79 may have the same shape. The support shaft 75 may also be connected to the outer lever 79.

As illustrated in FIGS. 5A and 5B, the support shaft 75 is fixedly attached at one end of the inner lever 79. Further, one end (lower end) of a connecting portion 80 is rotatably attached to the other end of each of the outer lever 79 and the inner lever 79. Further, an intermediate position between both the ends of the inner lever 79 and the outer lever 79 are rotatably supported by the lever shaft 91 and the lever holding portion 56. Then, a position of the corresponding connecting portion 80 in the height direction D2 varies depending on a position of the support shaft 75 in the height direction D2. That is, the corresponding connecting portion 80 ascends when the support shaft 75 descends, and the corresponding connecting portion 80 descends when the support shaft 75 ascends.

As illustrated in FIG. 4, an end of an elevating shaft holding portion 77 is rotatably connected to the other end (upper end) of the connecting portion 80, and the elevating shaft holding portion 77 moves in the height direction D2 together with the connecting portion 80. In the illustrated adjustment unit 33, two ends of each of the elevating shaft holding portions 77 are supported by the two connecting portions 80, and an upper end of the rotary shaft 45 is connected to a central portion between both the ends of the elevating shaft holding portion 77. Although the rotary shaft 45 can be rotated about the holding rotation axis A3 without being restricted by the elevating shaft holding portion 77, positions and movement of the rotary shaft 45 in the horizontal direction D1 and the height direction D2 are restricted by the elevating shaft holding portion 77. Therefore, the rotary shaft 45 also moves in the height direction D2 along with the movement of the support shaft 75, the lever 79, the connecting portion 80, and the elevating shaft holding portion 77 in the height direction D2.

Rotary gears 46 are fixedly attached to the rotary shafts 45, respectively. Each of the rotary gears 46 has a central axis and a rotation axis, which are common to those of the corresponding rotary shaft 45, and rotates together with the corresponding rotary shaft 45 about the holding rotation axis A3. The plurality of rotary shafts 45 are connected to the plurality of swinging portions 35 via the rotary gears 46, respectively, and are connected to the plurality of second holding portions 32.

In the illustrated relay device 12, the elevating shaft holding portion 77 is connected to one end (that is, an upper end) of each of the rotary shafts 45, the second holding portion 32 is fixedly attached to the other end (for example, a lower end), and the rotary gear 46 is fixed to an intermediate portion between both the ends of each of the rotary shafts 45. Further, there is a portion, supported by an elevating shaft restriction portion 81, between the rotary gear 46 of the rotary shaft 45 and the elevating shaft holding portion 77.

In this manner, the plurality of rotary shafts 45 are provided to be rotatable about the holding rotation axis A3, respectively, and are supported by the elevating shaft restriction portions 81, respectively, formed on the relay rotary table 30. The elevating shaft restriction portions 81 as many as the rotary shafts 45 (in the illustrated example, the four elevating shaft restriction portions 81) are provided at equal angular intervals about the relay rotation axis A1 in an outer circumferential portion of the relay rotary table 30. Although the rotation about the holding rotation axis A3 and the movement in the height direction D2 of each of the rotary shafts 45 are not restricted by the elevating shaft restriction portion 81, the movement of each of the rotary shafts 45 in the horizontal direction D1 is restricted by the corresponding elevating shaft restriction portion 81.

Each of the second holding portions 32 is connected to the relay rotary table 30 via the rotary shaft 45 and the elevating shaft restriction portion 81. The two chuck portions 42 included in each of the second holding portions 32 are arranged at symmetric positions about the rotary shaft 45 in the horizontal direction D1, and a relative position and a relative angle of each of the chuck portions 42 with respect to the relay rotary table 30 change along with the axial rotation of the rotary shaft 45. Incidentally, the relative angle of each of the second holding portions 32 with respect to the relay rotary table 30 changes along with the axial rotation of the rotary shaft 45, but the relative position of each of the second holding portions 32 (in particular, a portion of the second holding portion 32 through which the rotation axis (the holding rotation axis A3) passes (in the present embodiment, a central portion of the second holding portion 32)) with respect to the relay rotary table 30 does not change. FIG. 4 illustrates both the chuck portion 42 in an open state and the chuck portion 42 in the closed state.

The plurality of fixed shafts 34 rotate intermittently about the relay rotation axis A1 together with the relay rotary table 30. Each of the fixed shafts 34 moves on a circular orbit located at an equal distance from the relay rotation axis A1 in the horizontal direction D1. The plurality of fixed shafts 34 serves to connect the plurality of swinging portions 35 to the relay rotary table 30, and each of the fixed shafts 34 becomes a swing center of the corresponding swinging portion 35. Therefore, the number of the fixed shafts 34 is the same as the number of the swinging portions 35, and is "4" in the illustrated relay device 12.

The guide plate 38 is fixed to the cam fixing stand 70 and does not move regardless of each rotation of the first rotary shaft 68, the second rotary shaft 69, and the relay rotary table 30. The guide plate 38 has a guide groove 37 formed endlessly around the relay rotation axis A1. Each of the guide shafts 36 is slidably arranged in the guide groove 37, and the guide groove 37 serves to guide the movement of the guide shaft 36 in the horizontal, direction D1. In particular, a distance the guide groove 37 of the present embodiment from the relay rotation axis A1 changes in the rotation direction (that is, the relay rotation direction Dr1) about the relay rotation axis A1 (see FIG. 6).

A swinging state of each of the swinging portions 35 is determined depending on positions of the corresponding fixed shaft 34 and the corresponding guide shaft 36. Although the rotation of the relay rotary table 30 causes each of the fixed shafts 34 to move on the circular orbit, equi-distant from the relay rotation axis A1, each of the guide shafts 36 moves along the guide groove 37 whose distance from the relay rotation axis A1 is not constant. Thus, as the relay rotary table 30 rotates, a relative position between the fixed shaft 34 and the guide shaft 36 attached to each of the swinging portions 35 changes, and the swinging state of each of the swinging portions 35 also changes.

Each of the swinging portions 35 of the present embodiment has a sector-shaped planar shape as illustrated in FIG. 6. The fixed shaft 34 is attached at a point corresponding to a center of the sector shape (that is, a position where two radii intersect each other) of each of the swinging portions 35, a gear is formed at a point corresponding to an arc of the sector shape of each of the swinging portions 35, and the gear meshes with the rotary gear 46. Further, the guide shaft 36 is attached at a point corresponding to one end of the arc of the sector shape of the swinging portions 35. Each of the swinging portions 35 swings about the corresponding fixed shaft 34 depending on the distance from the relay rotation axis A1 of the corresponding guide shaft 36. When each of the swinging portions 35 swings, the corresponding rotary gear 46 and the rotary shaft 45 are rotated, and the second holding portion 32 connected to the rotary shaft 45 also rotates about the holding rotation axis A3. Since each of the second holding portions 32 rotates about the holding rotation axis A3 together with the corresponding rotary shaft 45 in this manner, the relative angle of each of the second holding portions 32 with respect to the relay rotary table 30 is adjusted. That is, each of the second holding portions 32 moves on the circular orbit about the relay rotation axis A1, and is changed in orientation (that is, a relative orientation with respect to the relay rotary table 30) depending on a position on the circular orbit.

In the relay device 12 having the above-described configuration, the first motor 61 and the second motor 65 are controlled by the control panel 17 to output rotational power via the rotation output shaft 61a and the rotation output shaft 65a, respectively.

The first gear 62 axially rotates with the rotation output shaft 61a of the first motor 61, and the second gear 64 rotates about the relay rotation axis A1 along with the rotation of the first gear 62. The first rotary shaft 68 and the relay rotary table 30 also rotate about the relay rotation axis A1 along with the rotation of the second gear 64. The rotary shaft 45 and the second holding portion 32 rotate about the relay rotation axis A1 along with the rotation of the relay rotary table 30. As a result, the second holding portion 32 goes around the pre-stage delivery station S0, the supply station S1, the discharge station S10, and the post-stage delivery station S11. On the other hand, the fixed shaft 34 and the swinging portion 35 rotate in the relay rotation direction Dr1 about the relay rotation axis A1 together with the relay rotary table 30. Further, the rotary gear 46 rotates in the relay rotation direction Dr1 about the relay rotation axis A1 together with the rotary shaft 45. Therefore, the rotary gear 46 is maintained in the state of being engaged with the swinging portion 35 during the movement of the swinging portion 35 and the rotary gear 46 in the relay rotation direction Dr1.

As the swinging portion 35 moves in the relay rotation direction Dr1, the guide shaft 36 moves around the relay rotation axis A1 along the fixedly provided guide groove 37, the swinging portion 35 swings about the fixed shaft 34, and the rotary gear 46 and the rotary shaft 45 rotate about the holding rotation axis A3 by an angle depending on the swinging of the corresponding swinging portion 35 (see FIG. 6). In this manner, each rotation amount of the rotary shaft 45 and the rotary gear 46 is determined depending on the swinging state of the swinging portion 35, and the relative angle of the corresponding second holding portion 32 with respect to the relay rotary table 30 is determined depending on the rotation amount of the rotary shaft 45. Therefore, when a position of the guide groove 37 from the relay rotation axis A1 is adjusted such that each of the swinging portions 35 is set to a desired swinging state at each station, the relative angle of the second holding portion 32 with respect to the relay rotary table 30 can be optimized for each station.

On the other hand, the third gear 66 axially rotates together with the rotation output shaft 65a of the second motor 65, and the fourth gear 67 rotates about the relay rotation axis A1 along with the rotation of the third gear 66. Then, the second rotary shaft 69 also rotates about the relay rotation axis A1 along with the rotation of the fourth gear 67. Along with the rotation of the second rotary shaft 69, the second cam holding portion 76 and the second cam 73 rotate about the relay rotation axis A1, and the cam groove 72 also rotates about the relay rotation axis A1. As a result, it is possible to adjust the positions of the adjustment unit 33 and the second holding portion 32 in the height direction D2 to be arranged at the pre-stage delivery station S0, the supply station S1, the discharge station S10, and the post-stage delivery station S11.

Since the control panel 17 controls the first motor 61 as described above, each of the second holding portions 32 can be arranged at appropriate angle and position in each of the pre-stage delivery station S0, the supply station S1, the discharge station S10, and the post-stage delivery station S11. In addition, since the control panel 17 controls the second motor 65, it is possible to adjust the position of the second holding portion 32 in the height direction D2 in the pre-stage delivery station S0, the supply station S1, the discharge station S10, and the post-stage delivery station S11.

[Operation Flow]

Next, operation flow of the relay device 12 of the present embodiment will be described. A series of behaviors to be described hereinafter are performed by controlling the respective devices constituting the packaging system 10 using the control panel 17. Further, only the single second holding portion 32 is focused on in the following description, but the other second holding portions 32 also operate in the same manner in each station.

First, the bag B (for example, an empty bag) accommodated in the bag supply unit 15 is unloaded by the unloading device 52 and is transferred to a position corresponding to each of the chuck portions 42 of the second holding portion 32 arranged at the pre-stage delivery station S0. At this time, each of the chuck portions 42 is open. Then, each of the chuck portions 42 of the second holding portion 32 is closed under the control of the control panel 17, the bag B is held by the respective chuck portions 42, and the bag B is released from the unloading device 52 (for example, the suction plate 52b).

Then, a position of the bag B in the height direction D2 held by each of the chuck portions 42 is detected by the detection sensor 53, and a detection result is sent from the detection sensor 53 to the control panel 17.

Then, the first motor 61 is controlled by the control panel 17, and the second holding portion 32, which is arranged at the pre-stage delivery station S0 and holds the bag B, is moved to the supply station S1.

Then, the first holding portion 31 and the second holding portion 32 are controlled by the control panel 17, the bag B held by the respective chuck portions 42 is gripped by the respective gripper portions 41 arranged at the supply station S1, and then, the bag B is released from the holding of the respective chuck portions 42.

Further, the first motor 61 is controlled by the control panel 17, and the second holding portion 32, which is arranged at the supply station S1 and does not hold the bag B, is moved to the discharge station S10.

Further, the first holding portion 31 and the second holding portion 32 are controlled by the control panel 17, the bag B, which are gripped by the gripper portions 41 arranged at the discharge station S10, are held by the chuck portions 42, and then, the bag B is released from the gripping of the respective gripper portions 41.

Then, the first motor 61 is controlled by the control panel 17, and the second holding portion 32, which is arranged at the discharge station S10 and holds the bag B, is moved to the post-stage delivery station S11. Then, the second holding portion 32 is controlled by the control panel 17, and the bag B is released from the holding of the respective chuck portions 42. Although the bag B released from the holding of the chuck portions 42 at the post-stage delivery station S11 naturally falls to be placed on a belt conveyor of the bag discharge unit 16 in the present embodiment, the bag B may be delivered from the chuck portion 42 to the bag discharge unit 16 via an arbitrary device.

Then, the first motor 61 is controlled by the control panel 17, and the second holding portion 32, which is arranged at the post-stage delivery station S11 and does not hold the bag B, is moved to the pre-stage delivery station S0. Then, a series of the above-described processes are repeatedly performed if necessary.

Incidentally, it is necessary to prevent the second holding portions 32 from colliding with another device while the respective second holding portions 32 go around the pre-stage delivery station S0, the supply station S1, the discharge station S10, and the post-stage delivery station S11. For this purpose, the second cam roller 74 and the support shaft 75 are guided in the height direction D2 by the cam groove 72 in a section where such a collision is likely to occur, and the second holding portion 32 is raised or lowered. For example, when there is a concern that the second holding portion 32 (particularly, each of the chuck portions 42) collides with another device (for example, the packaging rotary table 40) only during movement from the discharge station S10 to the post-stage delivery station S11, the second holding portion 32 is raised only while the second holding portion 32 moves from the discharge station S10 to the post-stage delivery station S11 so that it is possible to avoid the collision between the second holding portion 32 and the packaging rotary table 40.

[Relative Angle of Second Holding Portion 32 with Respect to Relay Rotary Table 30]

Next, the relative angle of the second holding portion 32 with respect to the relay rotary table 30 will be described.

Figure 7:
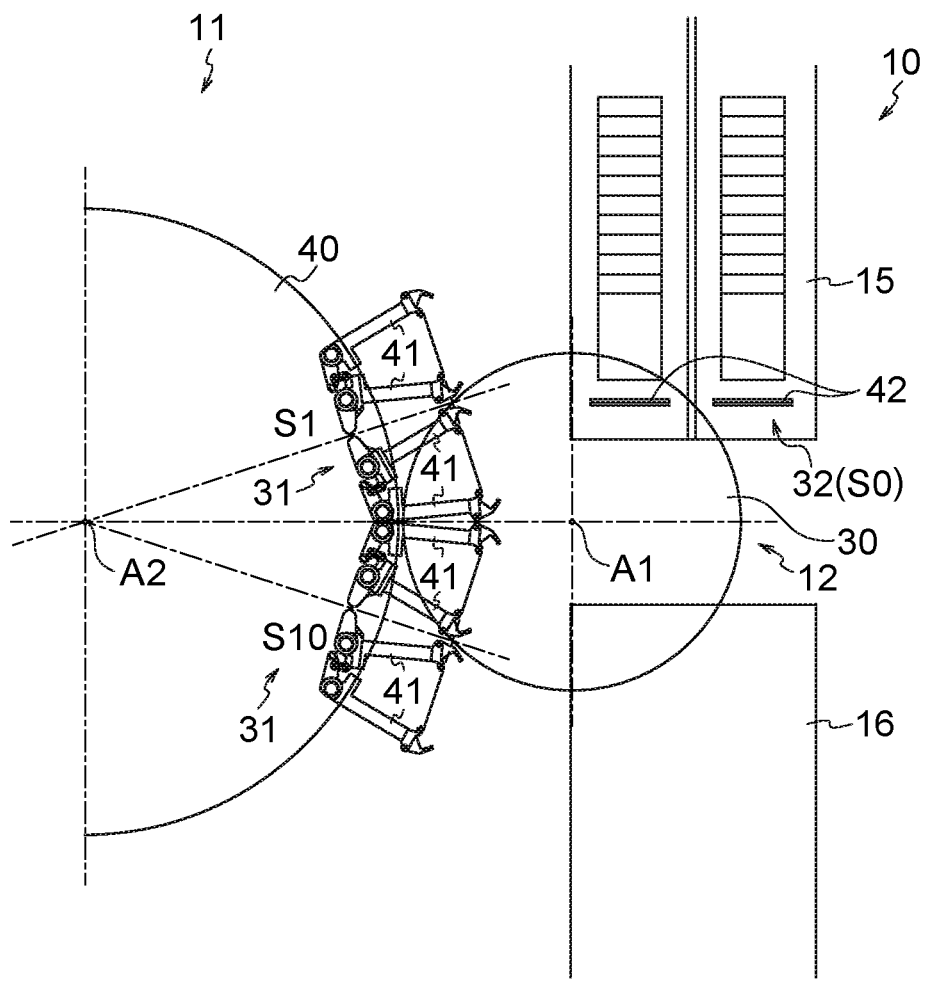
FIG. 7 is a plan view for describing a relative angle of a second holding portion.
Figure 8:
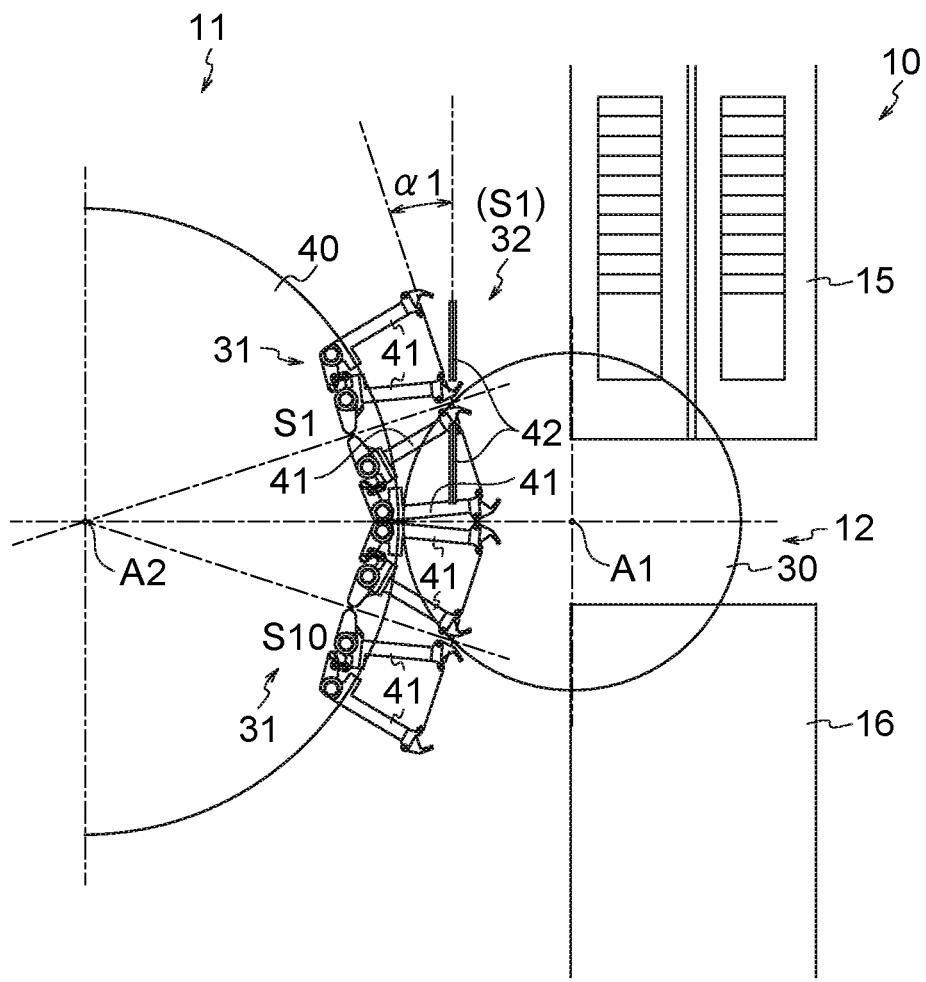
FIG. 8 is a plan view for describing the relative angle of the second holding portion.
Figure 9:
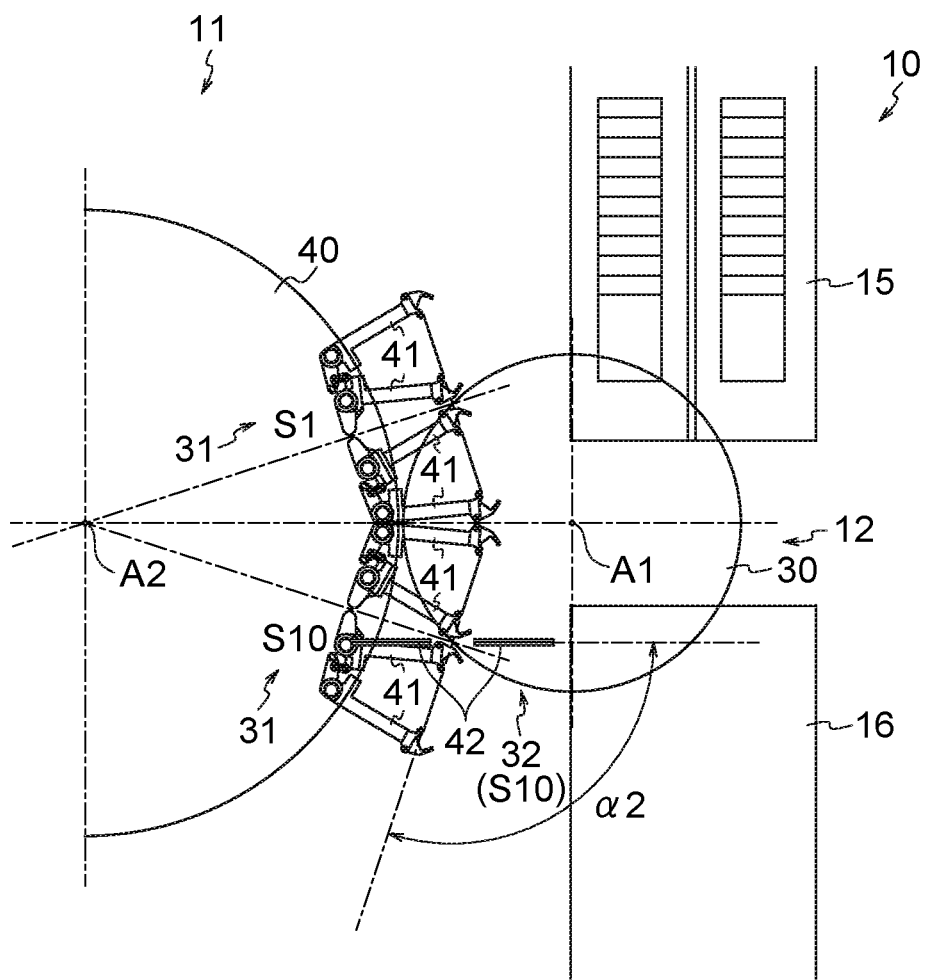
FIG. 9 is a plan view for describing the relative angle of the second holding portion.

FIGS. 7 to 9 are plan views for describing the relative angle of the second holding portion 32, which illustrate only the single second holding portion 32 and do not illustrate the other second holding portions 32. FIG. 7 illustrates a state where the second holding portion 32 is arranged at the pre-stage delivery station S0, FIG. 8 illustrates a state where the second holding portion 32 is arranged at the supply station S1, and FIG. 9 illustrates a state where the second holding portion 32 is arranged at the discharge station S10.

FIGS. 7 to 9 illustrate a case where the relative angle of the second holding portion 32 to the relay rotary table 30 is not adjusted. That is, FIGS. 7 to 9 illustrate a case where the relative angle of the second holding portion 32 with respect to the relay rotary table 30 is the same among the state where the second holding portion 32 is arranged at the pre-stage delivery station S0, the state where the second holding portion 32 is arranged at the supply station S1, and the state where the second holding portion 32 is arranged at the discharge station S10.

For example, when the relay rotary table 30 is rotated to arrange the second holding portion 32 at the supply station S1 while maintaining the relative angle of the second holding portion 32 arranged at the pre-stage delivery station S0 with respect to the relay rotary table 30 in an appropriate state as illustrated in FIG. 7, the second holding portion 32 is arranged in the state illustrated in FIG. 8. That is, the second holding portion 32 is arranged at the supply station S1 in a state of being shifted by an angle α1 with respect to the state of the second holding portion 32 arranged at optimum angle and position at the supply station S1. Similarly, when the relay rotary table 30 is rotated to arrange the second holding portion 32 at the discharge station S10 while maintaining the relative angle of the second holding portion 32 arranged at the pre-stage delivery station S0 with respect to the relay rotary table 30 in an appropriate state, the second holding portion 32 is arranged in the state illustrated in FIG. 9. That is, the second holding portion 32 is arranged at the discharge station S10 in a state of being shifted by an angle α2 with respect to the state of the second holding portion 32 arranged at optimum angle and position at the discharge station S10.

As apparent from FIGS. 7 to 9, there are stations incapable of appropriately delivering the bag B when the relative angle of the second holding portion 32 with respect to the relay rotary table 30 is not adjusted. On the other hand, when the relative angle of the second holding portion 32 with respect to the relay rotary table 30 is optimized for each station by the adjustment unit 33 as in the relay device 12 according to the present embodiment, it is possible to appropriately deliver the bag B at all of the pre-stage delivery station S0, the supply station S1, the discharge station S10, and the post-stage delivery station S11.

As described above, the supply of the bag B to the packaging machine 11 and the reception of the bag B discharged from the packaging machine 11 can be appropriately performed by the relay device 12 according to the present embodiment. Further, since the supplying device and the receiving device of the bag B with respect to the packaging machine 11 are realized by the single relay device 12, it is possible to reduce an installation space of the device. Further, since each of the second holding portions 32 of the relay device 12 can be moved among the stations by the relay rotary table 30 rotating in one direction (that is, the relay rotation direction Dr1), it is possible to receive and deliver the bag B at high speed in each station.

Further, the relative angle of each of the second holding portions 32 with respect to the relay rotary table 30 can be appropriately adjusted by utilizing the cam mechanism of the guide shaft 36 and the guide groove 37. Therefore, in order to appropriately adjust the relative angle of each of the second holding portions 32 with respect to the relay rotary table 30, it is unnecessary to provide an additional mechanism to directly and positively drive each of the second holding portions 32, and it is also unnecessary to control such an additional mechanism. The position and angle of each of the second holding portions 32 can be adjusted by such a simple and inexpensive configuration.

(First Modified Example)

Figure 10:
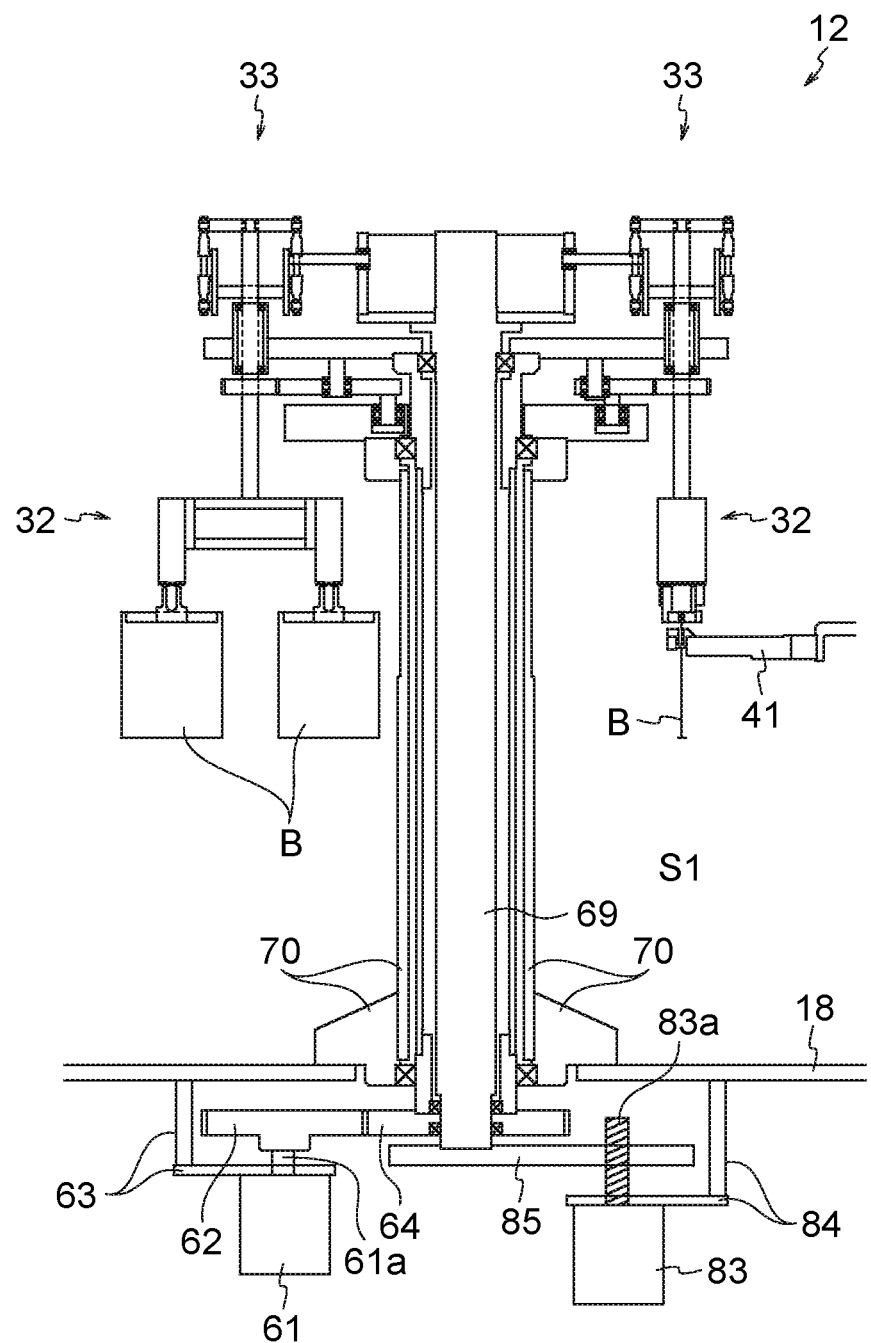
FIG. 10 is a side view illustrating a configuration of a relay device according to a modified example, which illustrates a state before adjusting a position of a bag in a height direction.
Figure 11:
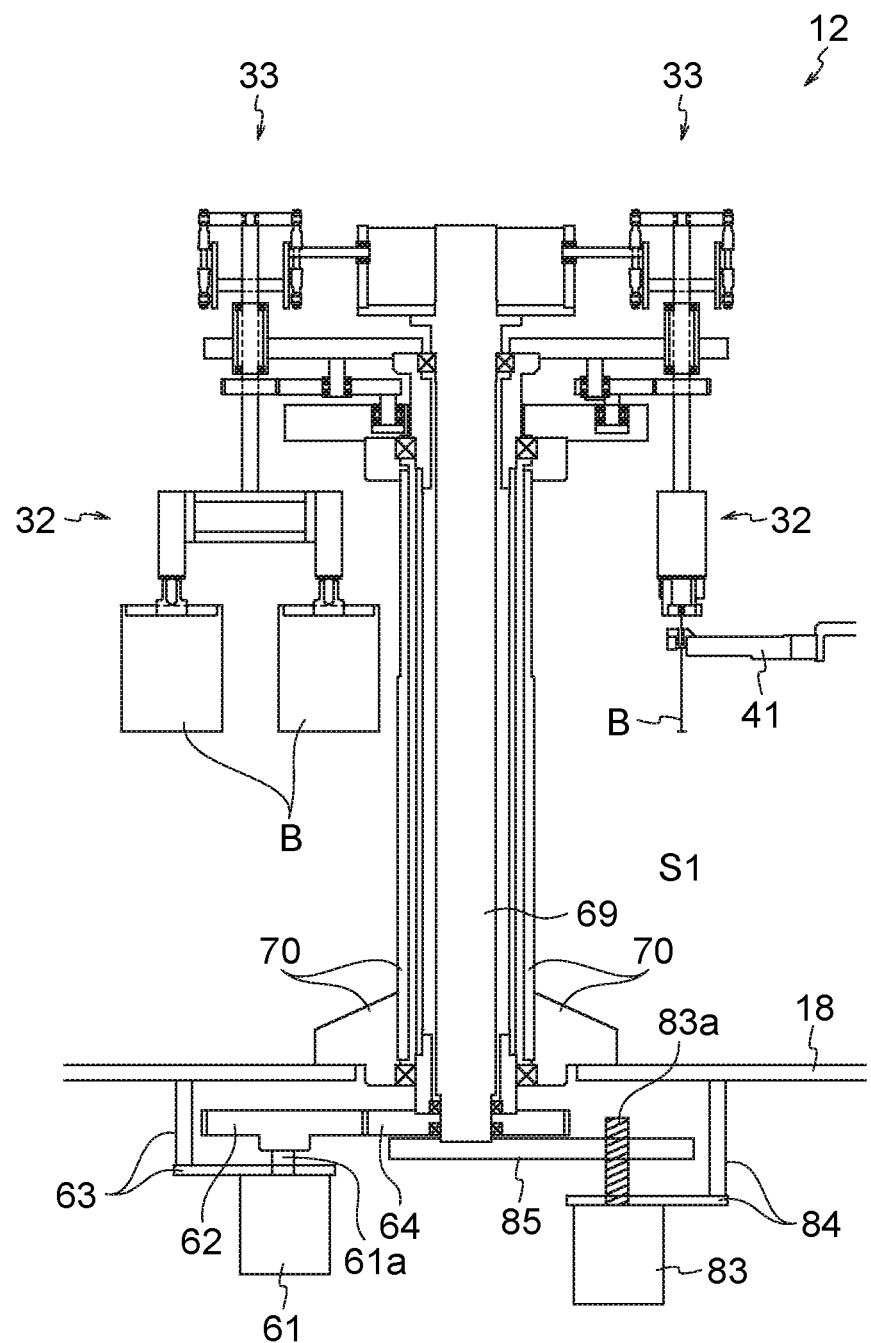
FIG. 11 is a side view illustrating the configuration of the relay device according to the modified example, which illustrates a state after adjusting the position of the bag in the height direction.

FIGS. 10 and 11 are side views which illustrate a configuration of the relay device 12 according to a modified example, FIG. 10 illustrates a state before adjusting a position of the bag B in the height direction D2, and FIG. 11 illustrates a state after adjusting the position of the bag B in the height direction D2.

In the present modified example, a third motor 83, fixed to the mount 18 via a third motor support portion 84, and an elevating plate 85, screwed to a rotation output shaft 83a of the third motor 83 and fixed to one end (lower end) of the second rotary shaft 69, are provided instead of the above-described second motor 65, third gear 66, and fourth gear 67 (see FIG. 4). The third motor 83 rotates the rotation output shaft 83a extending in the height direction D2 under the control of the control panel 17. The elevating plate 85 is supported by the rotation output shaft 83a, moves up and down in the height direction D2 as the rotation output shaft 83a rotates, and the amount of movement of the elevating plate 85 in the height direction D2 is determined depending on the amount of rotation of the rotation output shaft 83a. Therefore, the control panel 17 controls the third motor 83 to rotate the rotation output shaft 83a by a desired amount, and can move the elevating plate 85 and the second rotary shaft 69 by a desired amount in the height direction D2.

For example, the control panel 17 can also directly or indirectly detect a positional deviation amount in the height direction D2 of the bag B, held by the second holding portion 32 at the supply station S1 or on the upstream side of the supply station S1 based on a detection result of the detection sensor 53 (see FIG. 2), and can control the third motor 83 to move the second rotary shaft 69 in the height direction D2 so as to offset the positional deviation amount. In this case, the bag B can be accurately arranged at a desired position in the height direction D2 in the supply station S1, and a desired point (height direction position) of the bag B can be gripped by the respective gripper portions 41 of the first holding portion 31. As the position of the bag B in the height direction D2 is corrected in this manner, for example, an appropriate point of the bag B can be sealed by an appropriate width, and the sealing by desired strength can be reliably applied to each of the bags B in the packaging machine 11 (see the first sealing station S7 and the second sealing station S8 in FIG. 1).

Incidentally, there is a concern that the elevating plate 85 may collide with the second gear 64 by raising the elevating plate 85. Therefore, the control panel 17 controls the third motor 83 so as to raise the elevating plate 85 within a range in which the elevating plate 85 does not collide with the second gear 64. Since the position correction in the height direction D2 of the bag B is usually performed in a range of several millimeters, it is preferable to install the second gear 64 and the elevating plate 85 such that a space of about several millimeters to several centimeters is provided between the second gear 64 and the elevating plate 85.

In this manner, the relay device 12 may further include: an elevating mechanism (that is, the third motor 83 and the elevating plate 85) that raises and lowers the plurality of second holding portions 32 in parallel with the packaging rotation direction Dr2; the detection sensor 53 that detects the position in the height direction D2 of the bag B held by the second holding portion 32 arranged at the supply station S1 or on the upstream side of the supply station S1; and the control panel 17 that controls the elevating mechanism (that is, the third motor 83) in accordance with the detection result of the detection sensor 53 and adjusts the positions of the plurality of second holding portions 32 in the height direction D2.

[Other Modified Examples]

The present invention is not limited to the above-described embodiment and modified example.

For example, although the first holding portion 31 of the above-described embodiment and modified example moves on the circular orbit, the movement orbit of the first holding portion 31 is not limited, and the first holding portion 31 may be moved along an endless orbit (for example, an elliptical orbit) other than the circle.

Further, the cam mechanism (the guide shaft 36, the guide groove 37, and the like) is utilized to adjust the relative angle of the second holding portion 32 with respect to the relay rotary table 30 in the adjustment unit 33 of the above-described embodiment and modified example, but another mechanism may be used. For example, the relative angle of each of the second holding portions 32 with respect to the relay rotary table 30 may be adjusted by rotating each of the second holding portions 32 using a servomotor (not illustrated).

Further, the detection sensor 53 may be installed at the supply station S1, and may detect the position in the height direction of the bag B held by the second holding portion 32 at the supply station S1. Further, the detection sensor 53 may be installed between the pre-stage delivery station S0 and the supply station S1, and may detect the position in the height direction of the bag B held by the second holding portion 32 between the pre-stage delivery station S0 and the supply station S1. Further, the elevating mechanism (the third motor 83 and the elevating plate 85) may raise and lower each of the second holding portions 32 at the supply station S1 under the control of the control panel 17, may raise and lower each of the second holding portions 32 at the pre-stage delivery station S0, and may raise and lower each of the second holding portions 32 during movement from the pre-stage delivery station S0 to the supply station S1.

Further, the number of the second holding portions 32 is not limited, and three or less second holding portions 32 may be attached to the relay rotary table 30, and five or more second holders 32 may be attached to the relay rotary table 30.

Further, a swing mechanism, which swings each of the plurality of swinging portions 35 depending on the position of the corresponding fixed shaft 34 around the relay rotation axis A1, includes the guide plate 38 having the guide groove 37 (guide portion) and the plurality of guide shafts 36 in the above-described embodiment. However, the swing mechanism is not limited to such a configuration. For example, the position of each of the guide shafts 36 (in particular, the distance of each of the guide shafts 36 from the relay rotation axis A1) may be adjusted using the cam mechanism. The swing mechanism may have, for example, a structure that applies a force to each of the guide shafts 36 in a direction in which each of the guide shafts 36 approaches the relay rotation axis A1. In this case, the guide portion can be configured as a guiding surface, and each of the guide shafts 36 can be pushed toward the guiding surface and move around the relay rotation axis A1 while being in contact with the guiding surface. As such a structure, for example, it is possible to consider a structure in which one end side of an elastic body such as a spring is connected to the relay rotary table 30 and the other end side of the elastic body is connected to the swinging portion 35. More specifically, one end of the elastic body may be attached to a first protrusion protruding from the relay rotary table 30 toward the swinging portion 35, and the other end of the elastic body may be attached to a second protrusion protruding from the swinging portion 35 toward the relay rotary table 30. A distance between the one end side of the elastic body (that is, the side connected to the relay rotary table 30) and the relay rotation axis A1 can be set to be shorter than a distance between the other end side of the elastic body (that is, the side connected to the swinging portion 35) and the relay rotation axis A1, and a force, directed to a point of the relay rotary table 30 to which the one end side of the elastic body is connected, is applied to a point of the swinging portion 35 to which the other end side of the elastic body is connected by the elastic body.

Further, each of the swinging portions 35 is swung by changing the distance from the relay rotation axis A1 of the guide shaft 36 fixed to each of the swinging portions 35 in the above embodiment, but the swing mechanism is not limited to such a configuration. For example, when a swing mechanism is configured based on a cam structure disclosed in Japanese patent application publication No. 9-95318 (for example, FIG. 4), it is possible to swing each of the swinging portions 35 without changing the distance from each of the guide shafts 36 from the relay rotation axis A1. In this case, the position of each of the guide shafts 36 changes in the height direction D2. In this manner, each of the swinging portions 35 can also swing about the corresponding fixed shaft 34 depending on the relative position between the corresponding guide shaft 36 and the guide plate 38.

Further, various modifications may be made to the respective elements of the embodiment and the modified examples described above. Further, the effects exerted by the present invention are not limited to the above-described effects, and specific effects according to the specific configuration of each embodiment can be exerted. In this manner, various additions, modifications, and partial deletions can be made to the respective elements described in the claims, the specification, the abstract, and the drawings without departing from a technical idea and a gist of the present invention.

The invention claimed is:

1. A packaging system comprising:
 a packaging machine that has a plurality of first holding portions provided to be intermittently movable, and sequentially arranges each of the plurality of first holding portions at a plurality of stations including a supply station and a discharge station; and
 a relay device that supplies a bag to the first holding portion arranged at the supply station and receives a bag discharged from the first holding portion arranged at the discharge station,
 wherein the relay device includes:
 a relay rotary table which intermittently rotates about a relay rotation axis extending parallel to a height direction;
 a plurality of second holding portions which are attached to the relay rotary table and arranged at a pre-stage delivery station, the supply station, the discharge station, and a post-stage delivery station according to rotation of the relay rotary table; and
 an adjustment unit which adjusts a relative angle of each of the plurality of second holding portions with respect to the relay rotary table,
 wherein each of the plurality of second holding portions transfers a bag received at the pre-stage delivery station to the supply station and transfers a bag received at the discharge station to the post-stage delivery station, and
 wherein the adjustment unit adjusts the relative angle of the second holding portion arranged at the supply station so as to match an angle of the first holding portion arranged at the supply station, and adjusts the relative angle of the second holding portion arranged at the discharge station so as to match an angle of the first holding portion arranged at the discharge station.

2. The packaging system as defined in claim 1, wherein the adjustment unit includes:
- a plurality of fixed shafts which are fixed to the relay rotary table and rotate about the relay rotation axis along with the relay rotary table;
- a plurality of swinging portions which are rotatably attached to the plurality of fixed shafts, respectively;
- a swing mechanism which swings each of the plurality of swinging portions depending on a position of the corresponding fixed shaft around the relay rotation axis; and
- a plurality of rotary shafts which are respectively connected to the plurality of swinging portions, respectively connected to the plurality of second holding portions, and provided to be rotatable about a holding rotation axis which is a central axis of each of the plurality of rotary shafts, the plurality of rotary shafts each rotating about the holding rotation axis by an angle corresponding to swinging of the corresponding swinging portion, and
- wherein the relative angle of each of the plurality of second holding portions is adjusted as each of the plurality of second holding portions rotates about the holding rotation axis along with the corresponding rotary shaft.

3. The packaging system as defined in claim 2, wherein the swing mechanism includes:
- a plurality of guide shafts which are fixed to the plurality of swinging portions, respectively; and
- a guide plate which has a guide portion formed around the relay rotation axis, does not rotate about the relay rotation axis, and causes the plurality of guide shafts to be guided by the guide portion,
- wherein the guide portion guides the plurality of guide shafts in such a manner that a distance between the relay rotation axis and each of the plurality of guide shafts varies in a rotation direction about the relay rotation axis, and
- wherein each of the plurality of swinging portions swings about the corresponding fixed shaft depending on the distance of the corresponding guide shaft from the relay rotation axis.

4. The packaging system as defined in claim 3, wherein the relay device further includes:
- an elevating mechanism which raises and lowers the plurality of second holding portions parallel to the height direction;
- a detection sensor which detects a position in the height direction of a bag held by the second holding portion arranged at the supply station or on an upstream side of the supply station; and
- a control unit which controls the elevating mechanism in accordance with a detection result of the detection sensor and adjusts a position of each of the plurality of second holding portions in the height direction.

5. The packaging system as defined in claim 4, wherein the plurality of second holding portions are arranged at a plurality of attachment positions which are angular positions different from each other in a rotational direction about the relay rotation axis.

6. The packaging system as defined in claim 5, wherein at least some of the plurality of second holding portions are simultaneously arranged at the pre-stage delivery station, the supply station, the discharge station, and the post-stage delivery station.

7. The packaging system as defined in claim 3, wherein the plurality of second holding portions are arranged at a plurality of attachment positions which are angular positions different from each other in a rotational direction about the relay rotation axis.

8. The packaging system as defined in claim 7, wherein at least some of the plurality of second holding portions are simultaneously arranged at the pre-stage delivery station, the supply station, the discharge station, and the post-stage delivery station.

9. The packaging system as defined in claim 2, wherein the relay device further includes:
- an elevating mechanism which raises and lowers the plurality of second holding portions parallel to the height direction;
- a detection sensor which detects a position in the height direction of a bag held by the second holding portion arranged at the supply station or on an upstream side of the supply station; and
- a control unit which controls the elevating mechanism in accordance with a detection result of the detection sensor and adjusts a position of each of the plurality of second holding portions in the height direction.

10. The packaging system as defined in claim 9, wherein the plurality of second holding portions are arranged at a plurality of attachment positions which are angular positions different from each other in a rotational direction about the relay rotation axis.

11. The packaging system as defined in claim 10, wherein at least some of the plurality of second holding portions are simultaneously arranged at the pre-stage delivery station, the supply station, the discharge station, and the post-stage delivery station.

12. The packaging system as defined in claim 2, wherein the plurality of second holding portions are arranged at a plurality of attachment positions which are angular positions different from each other in a rotational direction about the relay rotation axis.

13. The packaging system as defined in claim 12, wherein at least some of the plurality of second holding portions are simultaneously arranged at the pre-stage delivery station, the supply station, the discharge station, and the post-stage delivery station.

14. The packaging system as defined in claim 1, wherein the relay device further includes:
- an elevating mechanism which raises and lowers the plurality of second holding portions parallel to the height direction;
- a detection sensor which detects a position in the height direction of a bag held by the second holding portion arranged at the supply station or on an upstream side of the supply station; and
- a control unit which controls the elevating mechanism in accordance with a detection result of the detection sensor and adjusts a position of each of the plurality of second holding portions in the height direction.

15. The packaging system as defined in claim 14, wherein the plurality of second holding portions are arranged at a plurality of attachment positions which are angular positions different from each other in a rotational direction about the relay rotation axis.

16. The packaging system as defined in claim 15, wherein at least some of the plurality of second holding portions are simultaneously arranged at the pre-stage delivery station, the supply station, the discharge station, and the post-stage delivery station.

17. The packaging system as defined in claim 1, wherein the plurality of second holding portions are arranged at a plurality of attachment positions which are angular positions different from each other in a rotational direction about the relay rotation axis.

18. The packaging system as defined in claim 17, wherein at least some of the plurality of second holding portions are simultaneously arranged at the pre-stage delivery station, the supply station, the discharge station, and the post-stage delivery station.

* * * * *